2 Sheets--Sheet 1.
E. P. & L. RESTEIN.
Bronzing-Machines.
No. 151,913.　　　*Fig. 1.*　　　Patented June 9, 1874.
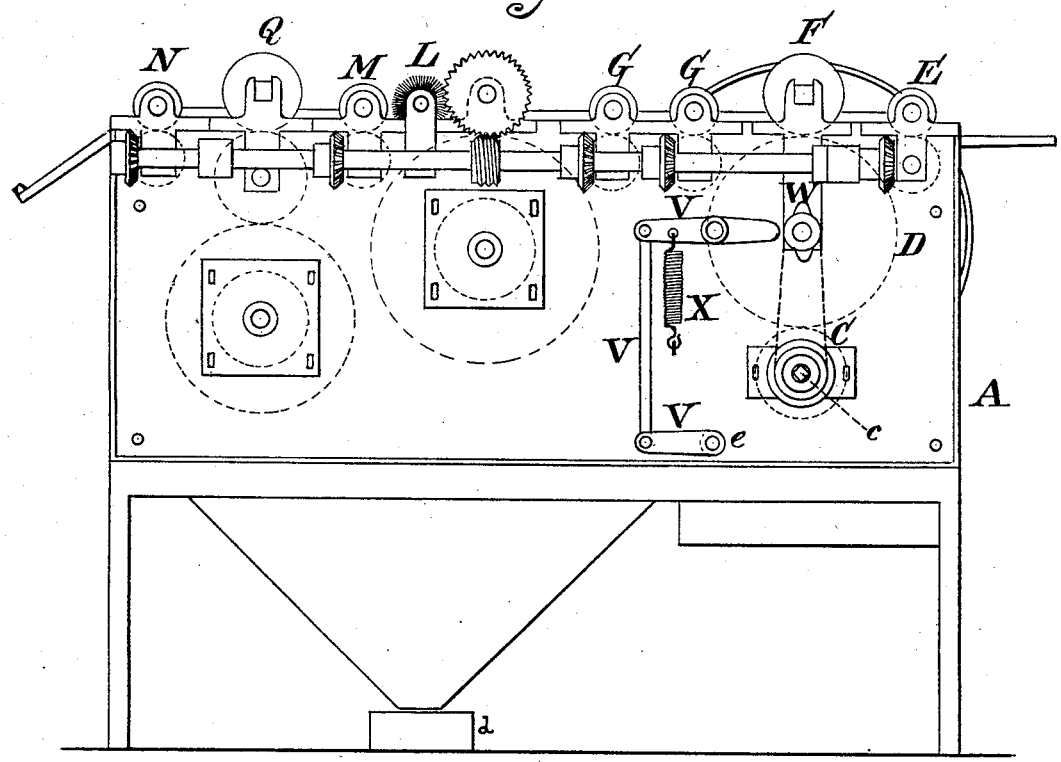
*Fig. 2.*
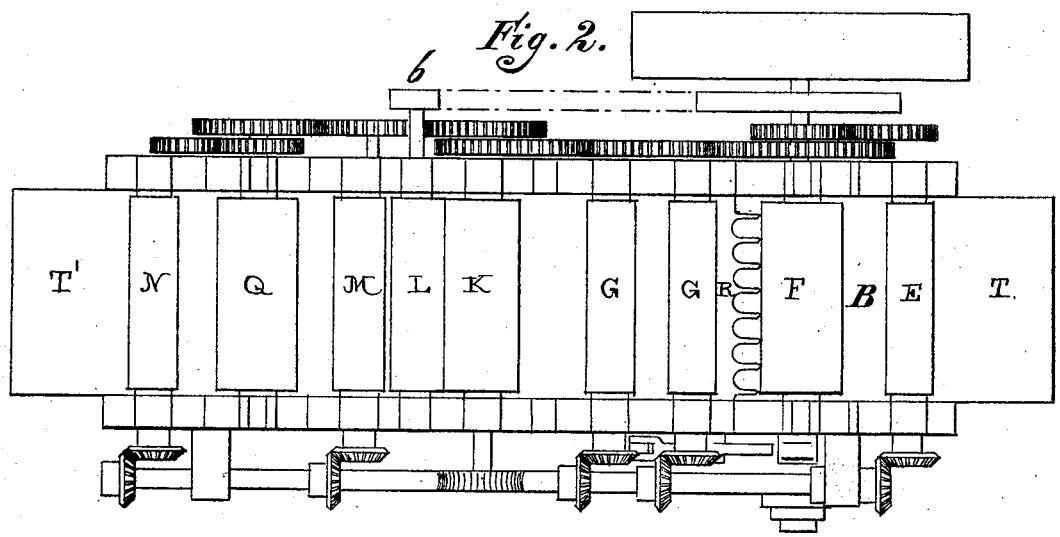
Witnesses:
Millard F. Walton,
Robert H. Hox.
Inventors:
Edmund P. Restein.
Louis Restein
by John A. Wiedersheim Co.
attys.

E. P. & L. RESTEIN.
Bronzing-Machines.
No. 151,913.   *Fig. 3.*   Patented June 9, 1874.
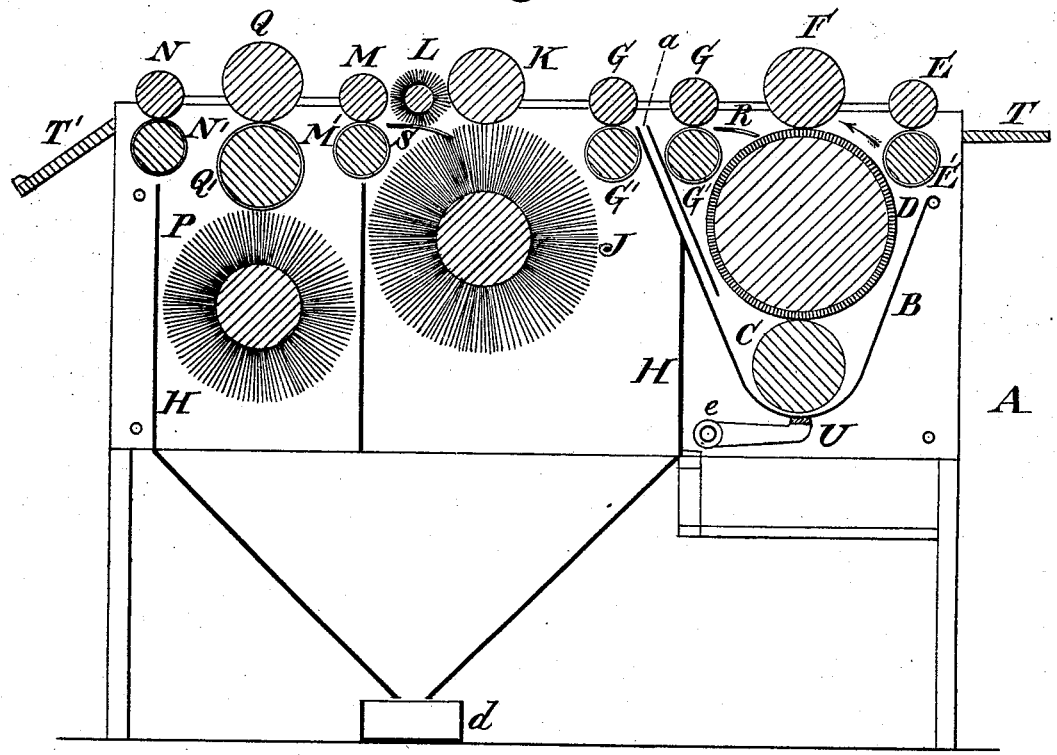
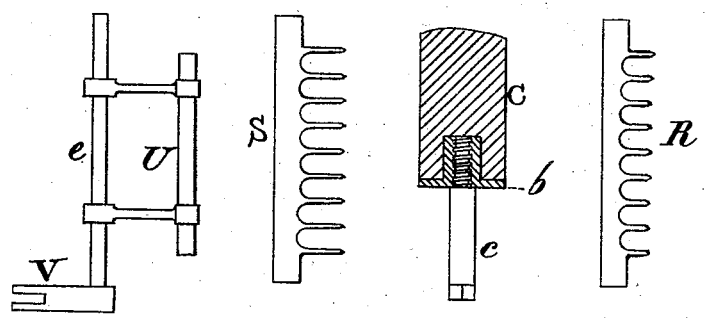
Witnesses:
Millard F. Walton,
Robert H. Hox.
Inventors:
Edmund P. Restein,
Louis Restein,
by John A. Wiedersheim & Co.
attys.

UNITED STATES PATENT OFFICE.

EDMUND P. RESTEIN AND LOUIS RESTEIN, OF PHILADELPHIA, PA.

IMPROVEMENT IN BRONZING-MACHINES.

Specification forming part of Letters Patent No. 151,913, dated June 9, 1874; application filed June 21, 1873.

*To all whom it may concern:*

Be it known that we, EDMUND P. RESTEIN and LOUIS RESTEIN, of the city and county of Philadelphia, and State of Pennsylvania, have invented new and useful Improvements in Machines for Bronzing and Dusting Paper; and we do hereby declare the following to be a clear and exact description of the nature thereof, sufficient to enable others skilled in the art to which our invention appertains to fully understand, make, and use the same, reference being had to the accompanying drawings making part of this specification, in which—

Figure 1 is a side elevation of the device embodying our invention. Fig. 2 is a top or plan view thereof. Fig. 3 is a central vertical longitudinal section thereof. Figs. 4, 5, 6, and 7 are views of detached parts.

Similar letters of reference indicate corresponding parts in the several figures.

This invention consists in certain parts constituting knocking mechanism operating against the bronze-receiving trough to cause the proper feeding of the bronze. It also consists in fingered pieces for preventing the sheet following the rotary motion of the napped drum and cleansing-brush. It also consists in the combination of parts.

Referring to the drawings, A represents a suitable frame for supporting the various working parts of the device. Between the side pieces of the frame, at the forward end thereof, there is suspended a trough, B, for the reception of the bronzing material or powder, which is preferably admitted or fed into said trough through the channel $a$, formed transversely in the trough. C represents a roller, which is properly mounted on the frame and rotates within the trough, near the bottom thereof, the rotary motion being imparted by suitable gearing fixed to the shaft $c$ or otherwise. This roller is designed to feed a "napped"-faced drum or cylinder, D, which is mounted above the roller C, and in contact therewith, and said feed-roller C is made removable from the trough for purposes of applying other rollers, as may be necessary, for the color of material or powder desired to be employed. This removability is accomplished by means of a screw-collar, $b$, fitted to one end of the roller, (see Fig. 6,) and the shaft or axis $c$ of the roller-screw into the collar, so that by the application of a proper implement to the squared head of said shaft the shaft may be removed from the collar, and thus leave the roller free to be removed. The surface of the bronzing drum or cylinder D consists of nap or some "furry" substance, which will be found to thoroughly take in the bronzing-powder or material from the roller C, and lift and convey it upward without falling or dropping off. E E' represent two rollers, which are arranged diagonally above the drum D, at the front or forward end of the frame, the lower roller being operated by suitable gearing, and the upper roller receiving motion from contact with the lower roller or the passage of the paper between the two rollers. Above the bronzing-cylinder is mounted a pressure block or cylinder, F, and two set of rollers, G G', similar to rollers E E', are mounted on the frame A, beyond the bronzing-cylinder, for purposes to be hereafter stated. H represents a trough, which is arranged within the frame, and extends from near the top to the bottom thereof, its lower portion terminating in a spout or conveyer for directing the surplus bronze or material to a place of deposit, as at $d$, which may be a drawer or otherwise for convenient access to the collected powder. A rotary brush, J, is mounted on the frame A, within the upper part of the trough H, and above this trough are arranged a geared chamois-covered roller, K, and a small geared rotary brush, L, and beyond the latter are mounted two rollers, M M', similar to rollers E E' G G', and, it will be observed, that similar rollers N N' are mounted near the end of the frame opposite to rollers E E' G G'. P represents a rotary brush, which is properly mounted, and rotates in the trough H near the brush J; and above said brush P there is mounted a roller, Q', which is covered with chamois, or other suitable polishing skin or material, and is in contact with the brush P. Above this roller Q' is mounted a fixed rod or pressure-block, Q. A toothed or fingered piece, R, is arranged in the space between the pressure-block F and rollers G, in juxtaposition to the surface of the bronzing-cylinder, and a similar piece, S, with longer fingers, is arranged below the brush L, and projects over and into the bristles of the brush J. A horizontal leaf or table, T, is attached to the frame A, at the forward end of the frame, and an inclined leaf, T', or table, is secured to the rear or back end of the table. U represents knockers or a knocking-bar, which is attached to a rock-shaft, e, below the trough B, and to which motion is communicated by means of levers V V mounted on the side of the frame A, which motion is imparted in one direction by the action of a tappet, W, on the shaft of the bronzing-drum, and in the other direction by a spring, X. The bearings of the shafts or axes of the drum D and brushes J P are made adjustable and removable in order to move up the brushes when worn, and permit the removal in cases where different-colored bronze is required to be applied. The lower rollers E' G' M' N' are faced with flannel or other suitable fabric, and receive motion from gearing, as do also the various other revolving parts of the device.

The operation is as follows: The paper to be bronzed, which may be in sheets or rolls, is properly sized or printed on one side, which is faced downward and directed between the rollers E E', which serve as friction and guide rollers, power having been previously applied to the various gearings for duly operating the lower rollers. The paper is carried forward between the rollers E E' and over the napped roller D. The feed-roller C takes up or directs the bronzing material or powder to the napped roller D, which carries the same upward to the paper as sized or printed, and applies the powder on the paper, which specially adheres to the pattern or places sized or printed. At the same time the napped roller partly polishes the applied bronze. The block or cylinder F serves as a bearing for the paper while the powder is being applied by the napped roller D, and said block or cylinder has a covering of zinc, or other bright metal or material, to be sufficiently rigid, and likewise permit the easy passage of the paper.

It will be here observed that the several lower rollers, E', G', &c., are sufficiently soft on their surface to prevent undue pressure on the sized or printed paper and injury thereto. At proper intervals the knocker U strikes against the trough B, so that the powder remains in the bottom thereof surrounding the feed-roller without packing, thus preventing crawling or gathering at one side of the feed-roller, and causes the proper conveyance of the powder to the bronzing-drum.

The paper is prevented from following the motion of the bronzing-drum by means of the fingered piece R, which guides the rollers G G', and, pressing therethrough, is directed through the next set G G'. The paper now reaches the brush J, which rubs the bronzed face, and sweeps therefrom all surplus or superfluous bronze, which is caught in the trough H, and directed to the receptacle or place of collection d. At the same time the chamois-covered roller K serves to partially clean or wipe the back of the sheet or paper. The fingered piece S prevents the paper from following the rotation of the brush J, and thus the paper passes under the brush L, and through the rollers M M', the brush L cleansing the back or upper side of the paper, and also the roller K. The paper, thus being free from loose or surplus powder, passes between the roller Q and pressure-block Q', and the bronzed face is subjected to the polishing action of the roller Q', after which the paper is passed out through the rollers N N' onto the table T', which may have a ledge at its outer end to retain the finished sheets.

Whatever bronze is removed from the paper by the polishing-wheel Q' will be brushed therefrom by the brush P, and such bronze, and that from the brush L, as well as that from brush J, as has been stated, will be caught in the trough H and directed to the place d. A suitable hood or covering will be supported on the frame-work and cover the rollers from above, for preventing the escape of the bronzing material and entrance of dust and dirt.

The "napped" roller receives and retains the powder from the feed-roller, and, owing to the hair which constitutes the nap, the powder may be said to have an affinity thereto, and thus adheres to the same until taken up by the size or ink on the paper, so that there is but little dropping or falling of the powder from the brush during its elevation.

Having thus described our invention, what we claim as new, and desire to secure by Letters Patent, is—

1. The knocker U, levers V V, tappets W, and spring X, combined and operating with the trough B, substantially as and for the purpose set forth.

2. The fingered pieces R S, arranged with the applying-roller C and cleansing-brush J, substantially as and for the purpose set forth.

3. The combination and arrangement of the applying-roller C below the napped drum D, with the pressure-block F above said drum, all constructed and operating as set forth.

4. The combination and arrangement of the roller K, the surface-cleansing brush J, and back-cleansing brush L, when constructed and operating as set forth.

5. The combination and arrangement of the rotary brush P below the polishing-roller Q', with the pressure-block Q above said roller, when constructed and operating as set forth.

6. The applying-drum D, feed-roller C, pressure-block F, trough B, and knocking mechanism U, the cleansing-brushes J L, and pressure roller K, the polishing-roller Q' cleansing-brush P, and pressure-block Q, and suitable feed and guide-rollers, all combined and arranged to operate substantially as and for the purpose set forth.

The above signed by us this 24th day of May, 1873.

EDMUND P. RESTEIN.
    LOUIS RESTEIN.

Witnesses:
 W. HARRISON FAY,
 GEO. McKEOWN.